F. B. KOUBA.
SLEIGH.
APPLICATION FILED FEB. 8, 1921.

1,413,738.

Patented Apr. 25, 1922.

Inventor

Frank B. Kouba

By William J. Jacobi, Attorney

UNITED STATES PATENT OFFICE.

FRANK B. KOUBA, OF GRAFTON, NORTH DAKOTA.

SLEIGH.

1,413,738.  Specification of Letters Patent.  Patented Apr. 25, 1922.

Application filed February 8, 1921. Serial No. 443,334.

*To all whom it may concern:*

Be it known that FRANK B. KOUBA, a citizen of the United States, residing at Grafton, in the county of Walsh and State of North Dakota, has invented certain new and useful Improvements in Sleighs, of which the following is a specification.

This invention relates to new and useful improvements in sleighs and more particularly to what is commonly known as a wagon sleigh, and the primary object is to provide a device of this character which will enable a wagon body to be readily applied to runners whereby to form a complete sleigh.

A further object of the invention resides in providing a sleigh which is simple and durable in construction, inexpensive to manufacture, and one which will be efficient in use.

With these and other objects in view my invention consists in the novel features of construction, combination and arrangement of parts as will be hereinafter referred to and more particularly pointed out in the specification and claim.

In the accompanying drawing, forming a part of this application—

Figure 1:
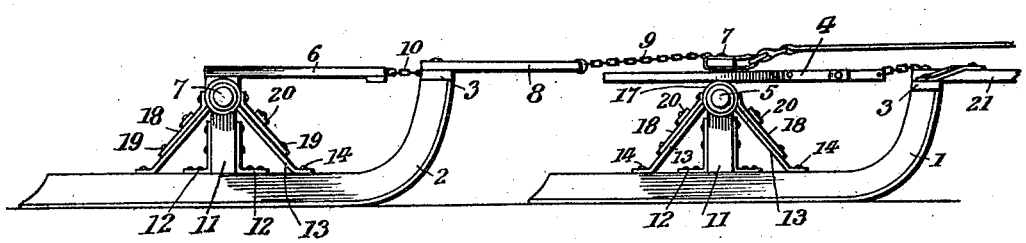
Figure 1 is a side elevation of the sleigh proper, constructed in accordance with my invention, the body being removed.
Figure 2:
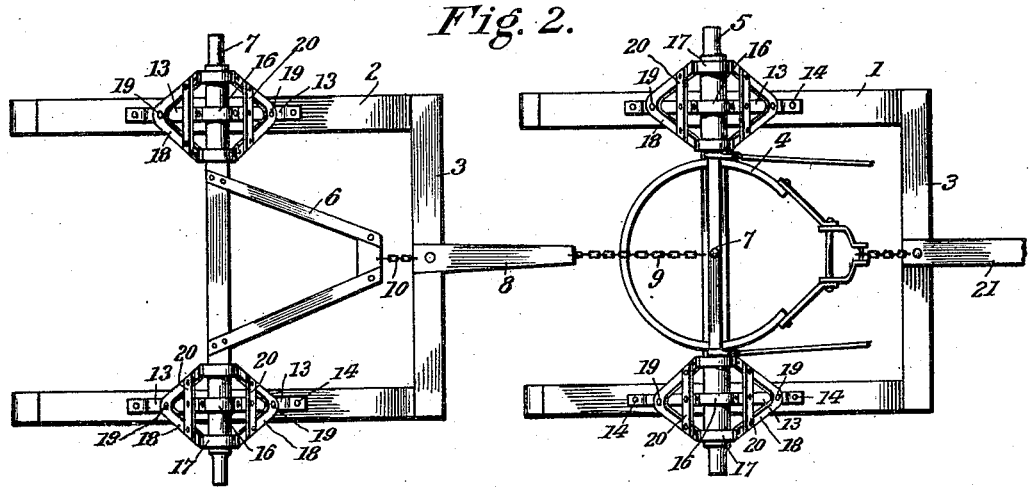
Fig. 2 is a plan view thereof.

In describing the invention, I shall refer to the drawing in which similar reference characters designate corresponding parts throughout the several views and in which 1 and 2 designate respectively pairs of front and rear runners, the forward ends of which are curved upwardly and connected in pairs by means of the transverse bars 3. My invention contemplates the provision of means whereby a wagon structure, with the wheels removed, may be readily transferred and secured to the aforesaid runners so that a wagon sled may be provided, thus eliminating the necessity of having both a sleigh and a wagon.

In the drawing I have shown in connection with the runners 1 and 2 the understructure of a wagon, the numeral 4 designating the front portion including the wagon skein or axle 5 and 6 designating the rear portion of the wagon including the skein or axle 7. A reach or the like 8 is secured to the roller or cross bar 3 of the rear runner and has connection with the front runner and has connection with the front portion of the sleigh by means of a chain 9 and connects with the rear portion 6 by means of the link connection 10.

Figure 3:
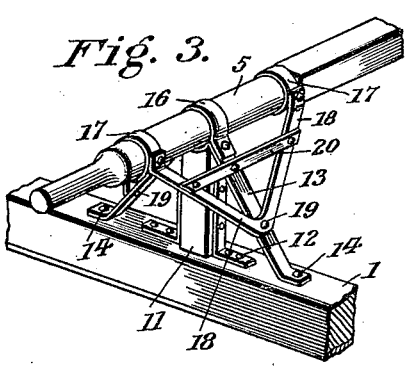
Fig. 3 is a detail perspective view, partly in section, showing the supporting structure on each runner.
Figure 4:
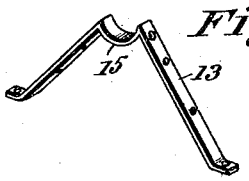
Fig. 4 is a perspective view of the main bracket or support on the runner.

An important feature of my invention resides in the particular structure supporting the skeins or axles on the runners. This structure consists of a wood block or main supporting member 11 which is secured to and supported on the runner by the angle straps 12, and the upper end of the block or support is concaved, as clearly shown in Fig. 3 of the drawing. A substantially inverted V-shaped strap or bracket 13 is provided which is secured at its ends to the runner in the rear and forward of the block or support 11, as shown at points designated at 14, and the intermediate portion of this bracket 13 is designed concavo-convex, as shown at 15 to be received in the upper concaved end of the support 11. This acts as a support for the skein or axle 5 as shown in Fig. 3 of the drawings, and an arcuate strap 16 is secured to the bracket 13 over said skein or axle 5.

Encircling the skein 5 on each side of the strap 16 are the collars 17 to which are secured in both the front and rear of the block 11, the angularly bent ends of the V-shaped brackets 18. The apices of these V-shaped brackets are secured to the arms of the bracket 13 as shown at 19. The arms of the V-shaped brackets 18 are braced by means of horizontal straps 20 which straps are also secured to the arms of the brackets 13. Through this medium each skein is properly supported on the runners and the supports are thoroughly braced in position against strain and movement.

A pole 21 may be secured to the cross-bar 3 of the front runners and the wagon body may, if desired, be applied to the lower wagon structure utilized in connection with this sleigh, although I have not shown the body of the wagon in the attached drawing.

In many States there are laws requiring the use of wagons and sleighs having standard treads, and as a great many sleighs are not of the standard width they cannot be used. By constructing a device such as I have herein described, one may readily transpose a wagon into a sleigh and comply with the laws with little or no expense.

While I have particularly described the elements best adapted to perform the functions set forth, it is obvious that various changes in form, proportion, and in the minor details of construction may be resorted to without departing from the spirit or sacrificing any of the principles of the invention.

What I claim is:—

In a device of the class described, the combination with a wagon skein, of runners, supporting blocks secured thereto and having the upper ends thereof concaved to receive the ends of said skein therein, substantially inverted V-shaped brackets supporting the blocks to the runners, means engaging the skein and said brackets to secure the former in position, additional V-shaped brackets secured to the aforesaid brackets on opposite sides of the skein, collars mounted on the inner and outer ends of the skein and supported by the additional V-shaped brackets, and spacing bars securing said brackets together.

In testimony whereof I affix my signature.

FRANK B. KOUBA.